Patented June 12, 1945

2,377,952

UNITED STATES PATENT OFFICE 2,377,952

PURIFICATION OF ALKYL METHACRYLATE MONOMERS

Barnard M. Marks, Newark, N. J., assignor to E. I. du Pont de Nemours & Company, Wilmington, Del., a corporation of Delaware No Drawing. Application July 13, 1943,
Serial No. 494,497

10 Claims. (Cl. 260—486)

This invention relates to the purification of alkyl methacrylate monomers obtained by thermal depolymerization of the corresponding polymers and, more particularly, to the purification of methyl methacrylate monomer obtained by such depolymerization.

The method of depolymerizing methacrylate polymers by heating to a temperature above their decomposition point as disclosed in Strain U. S. P. 2,030,901, has come into wide commercial use as a means of recovering valuable monomer from scrap polymer, especially in the case of methyl methacrylate. In normal times this is a measure of economy and during the present war emergency, when available supplies of new monomer are inadequate to meet all demands, it assumes greater importance in providing a source of monomer not otherwise available.

Heretofore, however, the utilization of the crude monomer originating from the depolymerization of polymer (hereinafter referred to as "recovered monomer") has been restricted to the making of polymer of inferior quality since the recovered monomer, as purified by methods heretofore known, has been invariably and characteristically inferior to new monomer (freshly synthesized monomer) in its color, and also has yielded resins of comparatively poor color and stability of color.

There are three significant tests by which the quality of monomer in these respects may conveniently and reliably be judged.

(1) The direct measurement of the color of the monomer in terms of APHA standards indicates the probable quality of the color of the resin which can be made from it. Ideally, the APHA color of monomer should be zero.

(2) A "sulfuric-acid color test" of the monomer is indicative of the extent to which a resin made from it will be discolored by exposure to heat and to light. Ideally, the monomer should give in this test a figure of zero.

The sulfuric-acid color test is conducted as follows: A volume of 50 cc. of the monomer is placed in a Nessler tube and into it is carefully poured, down the wall of the tube, 50 cc. of concentrated sulfuric acid. Careless or too rapid addition of the acid is to be avoided since it may occasion an evolution of heat so rapid as to cause spattering of the liquid. Nor should the mixture be stirred or shaken; the two liquids diffuse into each other rapidly enough despite their difference in density. The coloration which develops is measured, in APHA units, at the end of 15 minutes after the addition of the acid.

(3) The measurement of the percentage of visible light transmitted by the monomer is indicative of its purity in comparison with that of new monomer, which, in the case of properly synthesized methyl methacrylate, transmits substantially 100% under the test conditions. This measurement is conveniently made in any commercial photoelectric absorption apparatus, provided with a standard filament lamp and a standard Corning #365 blue-violet glass filter, which furnish a constant and substantially monochromatic light, and with a suitable measuring system. The absorption cell is made deep in order to promote the sensitivity of the measurements; a convenient and desirable depth for a standard commercial instrument is 15 cm.

In commercially purified form, new monomer is of very high quality. Thus a typical lot of new methyl methacrylate monomer will have an APHA color below 1, will give in the sulfuric-acid test a color of 20 to 40 and will transmit 95% to 100% of light under the conditions of the transmission test.

The nature of the characteristic impurities regularly present in recovered monomer, which have heretofore restricted its utility as raw material for manufacture of resins, is not known but the identification of these impurities is in no way essential to the understanding or utilization of the present invention. Throughout the present specification the plural form "impurities" is used for convenience, but without thereby excluding the possibility that in some instances only a single impurity may be involved.

This invention has as its principal object the purification of recovered monomer to such a degree as to make it fully equivalent to new monomer in color and in other significant measurable characteristics, and fully interchangeable with new monomer in the normal uses of the latter, including the manufacture of polymers of the highest quality. It is thus an important object of the invention to provide a method whereby to make feasible the recovery, from scrap, of methyl methacrylate monomer which can be used without restriction in the manufacture of polymers in their various commercial forms of molding powders, rods, tubes and cast sheeting, inclusive of sheeting of the particularly high quality demanded for use in aircraft and heretofore obtainable only by the use of new monomer. Other objects will be apparent from the description of the invention given hereinafter.

The above objects are accomplished according to the present invention by heating polymeric methyl methacrylate at a temperature above its decomposition point, condensing the vapors of methyl methacrylate monomer resulting therefrom, treating the recovered monomer with chlorine, and then distilling the treated monomer. In a preferred form of the invention, the recovered monomer is first steam distilled, the monomer separated from the water in the condensate, chlorine gas is bubbled through the monomer, the treated monomer is again steam distilled, the monomer separated from the water in the condensate, and, finally, the monomer is vacuum distilled.

The process does not depend upon the ordinary bleaching action of chlorine. The step of treating the recovered monomer with chlorine does not, of itself, effect a useful correction of its color. It appears rather that the success of the process depends upon a chlorination or oxidation of the impurities in the recovered monomer and thus their conversion into substances which are separable from the monomer itself by distillation. This explanation is consistent with the fact that the treatment with chlorine must be followed by a distillation. In this connection it is to be noted that the monomer itself is subject to chlorination but at a rate so much slower than the rate at which chlorine combines with its impurities that the loss of yield of monomer through chlorination of it is negligible unless the treatment with chlorine is unduly liberal or protracted.

A preliminary steam distillation of the crude recovered monomer is desirable because it promotes a high yield of purified monomer and benefits the quality of the purified monomer.

The crude monomer recovered by depolymerization of typical commercial scrap polymer contains not only those impurities which are derived from the polymer itself as by-products of the depolymerization, but also, and in considerably larger quantities, impurities originating in auxiliary ingredients, i. e., plasticizers, lubricants, coloring ingredients, etc. The total of impurities amounts typically to 8% to 20% of the recovered crude and is capable of consuming considerable chlorine but is largely separable from the monomer simply by steam distillation. If this large bulk of impurities is left present with the monomer during the treatment with chlorine, the treatment must be so protracted and the dosage of chlorine so liberal that an appreciable proportion of the monomer itself becomes chlorinated and hence wasted. A steam distillation prior to the treatment with chlorine suffices to reduce the content of impurities to as little as 0.1% to 0.2% of the monomer and this residue is effectively dealt with by a comparatively brief and mild treatment with chlorine which causes little, if any, chlorination of the monomer itself and thus does not depress the yield of monomer.

The benefit of preliminary steam distillation to the quality of the ultimate purified monomer is probably explainable as due to a removal thereby of certain minor impurities which are not fully disposed of by the treatment with chlorine followed by distillation. It has been stated above that the success of the process depends apparently upon chemical action of chlorine by which impurities which are not separable from monomer by distillation, are converted into other substances which are thus separable therefrom. It appears, however, that among the usual impurities of the crude recovered monomer there are present, in very small quantities, certain ones, probably of low boiling point, which are converted by chlorine into products of vapor pressure close to that of the monomer, which products are accordingly not satisfactorily separated from the monomer by the distillation which follows the treatment with chlorine; these particular impurities are separable from the crude monomer by a steam distillation prior to the treatment by chlorine.

The distillation of the recovered monomer after the treatment with chlorine, in order to separate it from the products of chlorination or oxidation of its impurities, will be carried out in such a way as to yield a distilled monomer of the desired degree of purity. Distillation under atmospheric pressure is impracticable because the temperature required is high enough to cause considerable polymerization of monomer. Distillation under reduced pressure may be found adequate to convert the chlorine-treated crude into monomer of acceptable purity, but it should be preceded by a step of neutralization of the acidity resulting from the treatment with chlorine; this neutralization is advisable for the protection of the equipment as well as to ensure the absence of hydrochloric acid from the distilled product. Steam distillation of the chlorine-treated monomer is still more effective in the separation of pure monomer from the chlorine-treated impurities. The best results, however, are obtained by subjecting the chlorine-treated monomer successively to a steam distillation and to a distillation under reduced pressure.

Thus the preferred procedure within the scope of the invention comprises successively (1) steam distillation of the crude recovered monomer, (2) treatment of this distillate with chlorine, (3) steam distillation of the chlorine-treated monomer, followed, of course, by separation of the monomer from the aqueous layer, and finally (4) vacuum distillation of the monomer.

The manner of application of chlorine to the recovered monomer, and the amount of chlorine required to accomplish the purposes of the invention, are subject to wide variation within the scope of the invention. Nor is the temperature of the treatment of importance, so long as it is not so high as to cause undue volatilization of the monomer; operation in the range of 15° C. to 60° C. is satisfactory. For reasons of economy and thoroughness of treatment, contact of the chlorine gas with the liquid recovered monomer should be intimate and complete. Any efficient equipment for intimate admixture of gas and liquid may be used, such as a vessel provided with an agitator and with a sparger tube or a porous plate, located at the bottom of the vessel, for the introduction of the chlorine in small bubbles.

The amount of chlorine required to be consumed will depend upon the character of the particular lot of recovered monomer which is being treated, and especially upon whether it has or has not been steam-distilled prior to the treatment with chlorine. The amount of chlorine actually consumed will range from about 0.1 to 0.25 part, by weight, per 100 parts of previously steam-distilled recovered monomer to about 1 to 2.5 parts per 100 parts of crude recovered monomer. The allowance for waste over and above such figures will depend of course upon the design and operation of the equipment used.

As a basis of judging when the treatment with chlorine has been adequately effected so that it may be terminated with a minimum of consumption of chlorine in the unwanted chlorination of the monomer itself, the odor of the chlorine-treated material will serve in a preliminary way since the treatment with chlorine gradually destroys the acrid odor of the untreated material and develops a sweet chloroform-like odor. The sample thus to be examined must, however, first be washed with water to free it of hydrochloric acid. As a conclusive test, a sample is distilled in the laboratory, and the distillate examined by the tests already described.

The process of the present invention constitutes an advance over that of applicant's copending application, Serial No. 365,463, filed November 13, 1940, which teaches that steam distillation of recovered monomer is capable of reducing its color to a value of 2 or less by APHA standards. The process of steam distillation as described in that application constitutes a preferred step in the process of the present invention.

The table given below facilitates direct comparison of several processes within the scope of the present invention, both with each other and with processes heretofore known for the purification of recovered monomer. An X in the column below the designation of a procedural step indicates the use of that step and in processes involving more than a single procedural step the steps are followed in the order listed. In each case the quality of the product of the process is given in terms of APHA color, color in the sulfuric-acid test, and percentage transmission.

TABLE I

*Treatment given*

| | Steam distillation | Vacuum distillation | Treatment with chlorine | Neutralization | Steam distillation | Vacuum distillation |
|---|---|---|---|---|---|---|
| 1 | | | | | | |
| 2 | | x | | | | |
| 3 | x | x | | | | |
| 4 | | | x | | | |
| 5 | | | x | | | |
| 6 | x | | x | | x | x |
| 7 | x | | x | x | | x |
| 8 | x | | x | | x | x |

*Quality of monomer*

| | APHA color | Color in sulfuric acid test | Percentage transmission |
|---|---|---|---|
| 1 | Distinctly yellow [1] | Brown to black [1] | Very low.[1] |
| 2 | 10 | 8,000–20,000 | Do. |
| 3 | 2 | 1,000–2,500 | 20–40. |
| 4 | Yellow [1] | Brown [1] | Very low.[1] |
| 5 | 0–2 | 600–1,000 | 85–90. |
| 6 | 2 | 250–600 | 75–85. |
| 7 | 0 | 350–600 | 90–95. |
| 8 | 0 | 100 | 95–97.5. |

[1] No measurement made.

1 is the crude recovered methyl methacrylate monomer which is variously processed as indicated in #2–#8.

2 shows a partial but very inadequate improvement in quality of this crude by simple vacuum distillation.

3 represents the preferred process of applicant's copending application, Serial No. 365,463, which improves the quality of the monomer very greatly and makes it entirely suitable for many commercial uses, but leaves its quality still measurably below that of new monomer of ordinary commercial purity.

4 shows that the treatment of crude recovered monomer with chlorine, which constitutes one of the essential steps of the present invention, is not capable by itself of effecting any marked improvement in the quality of the monomer. It reduces the depth of color of the monomer somewhat and effects some improvement in the color in the sulfuric-acid test, but leaves the monomer still entirely unsuitable for any commercial use. This result is clear evidence that the process of the invention does not depend more than in a very small way, if at all, upon the bleaching action of chlorine.

The four processes designated #5–#8 lie within the scope of the present invention, in that each of them comprises the step of treatment by chlorine and subsequently the step of distillation.

5 involves treating the crude recovered monomer directly with chlorine and then subjecting it successively to steam distillation and vacuum distillation. This procedure, although it is not the preferred embodiment of the present invention, delivers a refined monomer which is obviously superior to that of #4.

6 includes the desirable step of a steam distillation of the crude recovered monomer prior to its treatment with chlorine. The latter is followed by steam distillation of the chlorine-treated material.

7 likewise includes steam distillation prior to treatment with chlorine, and the vacuum distillation which follows the chlorine treatment is immediately preceded by a neutralization of the acidity of the chlorine-treated material by an appropriate amount of sodium hydroxide or other convenient alkaline material.

8 represents the preferred embodiment of the present invention, in which the treatment with chlorine is preceded by a steam distillation of the crude recovered monomer and is followed successively by steam distillation and vacuum distillation. It will be seen that this preferred process gives the best results in terms of the three significant tests of quality of monomer but also that the other three embodiments of the invention, namely #5, #6 and #7, give results which, although inferior to those of the preferred process, are definitely superior to those of the best process heretofore known, namely #3.

A direct comparison of processes #5 and #8 demonstrates the advantage in quality of final product which is obtained by way of the preferred preliminary step of a steam distillation preceding the treatment with chlorine. A further advantage of this step lies in its beneficial effects upon the yield of the treatment, through its elimination of some of the impurities initially present in the crude monomer and thus the reduction of the amount of chlorine which must be used and of the amount of loss of monomer by chlorination.

The scrap polymer from which the recovered monomer is derived by depolymerization is likely, in commercial practice, to contain various modifying agents, such as polymers of other ethenoid monomers and plasticizers, lubricants, etc. In general, however, it is not these that are responsible for the presence of the more troublesome colored impurities in the recovered monomer. It has already been pointed out that these modifying agents, or the products of their decomposition, are readily and desirably separated from the monomer by steam distillation.

Other ethenoid resins than polymethyl methacrylate in the scrap resin may be subject to an analogous depolymerization, but the resulting monomers will ordinarily differ so much from methyl methacrylate monomer in boiling point that their separation from it may be readily accomplished.

The procedure of the present invention contributes an advance in the art of economical recovery of monomeric methyl methacrylate in a condition of high purity and substantially perfect color from polymethyl methacrylate scrap of commercial quality. The purified monomer obtainable by the process of the invention from crude recovered monomer is of the high purity required for the production of resins of the very high quality currently demanded, particularly for such uses as airplane enclosures. Thus the invention makes feasible the effective utilization, without limitation as to quality, of the scrap polymer which is the inevitable by-product of manufacturing and fabricating operations.

As many apparently widely different embodiments of this invention may be made without departing from the spirit and scope thereof, it is to be understood that the invention is not limited to the specific embodiments thereof except as defined in the appended claims.

I claim:

1. Process of preparing methyl methacrylate monomer from polymeric methyl methacrylate, which process comprises heating polymeric methyl methacrylate at a temperature above its decomposition point, condensing the vapors of methyl methacrylate monomer resulting from said heating, treating said condensed monomer with chlorine until approximately 0.1 to 2.5 parts, by weight, of chlorine per 100 parts of monomer have been absorbed by said monomer and a water-washed sample of the monomer has a sweet, chloroform-like odor, and distilling said treated monomer.

2. Process of preparing methyl methacrylate monomer from polymeric methyl methacrylate, which process comprises heating polymeric methyl methacrylate at a temperature above its decomposition point, condensing the vapors of methyl methacrylate monomer resulting from said heating, passing chlorine gas in the form of fine bubbles through said condensed monomer while under agitation until approximately 0.1 to 2.5 parts, by weight, of chlorine per 100 parts of monomer have been absorbed by said monomer and a water-washed sample of the monomer has a sweet, chloroform-like odor, and thereafter distilling said monomer.

3. Process of preparing methyl methacrylate monomer from polymeric methyl methacrylate, which process comprises heating polymeric methyl methacrylate at a temperature above its decomposition point, condensing the vapors of methyl methacrylate monomer resulting from said heating, distilling said condensed monomer with steam, condensing the resulting mixture of vapors of monomer and water and separating the monomer from the water, treating said monomer with chlorine until approximately 0.1 to 2.5 parts, by weight, of chlorine per 100 parts of monomer have been absorbed by said monomer and a water-washed sample of the monomer has a sweet, chloroform-like odor, and distilling said treated monomer.

4. Process of preparing methyl methacrylate monomer from polymeric methyl methacrylate, which process comprises heating polymeric methyl methacrylate at a temperature above its decomposition point, condensing the vapors of methyl methacrylate monomer resulting from said heating, distilling said condensed monomer with steam, condensing the resulting mixture of vapors of monomer and water and separating the monomer from the water, passing chlorine in the form of fine bubbles through said condensed monomer while under agitation until approximately 0.1–0.25 part, by weight, of chlorine per 100 parts of monomer have been absorbed by said monomer, and then distilling said treated monomer.

5. Process of preparing methyl methacrylate monomer from polymeric methyl methacrylate, which process comprises heating polymeric methyl methacrylate at a temperature above its decomposition point, condensing the vapors of methyl methacrylate monomer resulting from said heating, distilling said condensed monomer with steam, condensing the resulting mixture of vapors of monomer and water and separating the monomer from the water, treating said condensed monomer with chlorine until approximately 0.1 to 2.5 parts, by weight, of chlorine per 100 parts of monomer have been absorbed by said monomer and a water-washed sample of the monomer has a sweet, chloroform-like odor, and distilling said monomer with steam.

6. Process of preparing methyl methacrylate monomer from polymeric methyl methacrylate, which process comprises heating polymeric methyl methacrylate at a temperature above its decomposition point, condensing the vapors of methyl methacrylate monomer resulting from said heating, distilling said condensed monomer with steam, condensing the resulting mixture of vapors of monomer and water and separating the monomer from the water, passing chlorine gas in the form of fine bubbles through said monomer while under agitation until approximately 0.1 to 2.5 parts, by weight, of chlorine per 100 parts of monomer have been absorbed by said monomer and a water-washed sample of the monomer has a sweet, chloroform-like odor, and thereafter distilling said monomer with steam.

7. Process of preparing methyl methacrylate monomer from polymeric methyl methacrylate, which process comprises heating polymeric methyl methacrylate at a temperature above its decomposition point, condensing the vapors of methyl methacrylate monomer resulting from said heating, distilling said condensed monomer with steam, condensing the reaction mixture of vapors of monomer and water and separating the monomer from the water, treating said condensed monomer with chlorine until approximately 0.1 to 2.5 parts, by weight, of chlorine per 100 parts of monomer have been absorbed by said monomer and a water-washed sample of the monomer has a sweet, chloroform-like odor, distilling said treated monomer with steam, condensing the resulting mixture of vapors of monomer and water and separating the monomer from the water, and vacuum distilling said monomer.

8. Process of preparing methyl methacrylate monomer from polymeric methyl methacrylate, which process comprises heating polymeric methyl methacrylate at a temperature above its decomposition point, condensing the vapors of methyl methacrylate monomer resulting from said heating, distilling said condensed monomer with steam, condensing the reaction mixture of vapors of monomer and water and separating the monomer from the water, passing chlorine gas in the form of fine bubbles through said condensed monomer while under agitation until approximately 0.1 to 2.5 parts, by weight, of chlorine per 100 parts of monomer have been absorbed by said monomer and a water-washed sample of the monomer has a sweet, chloroform-like odor, distilling said monomer with steam, condensing the resulting mixture of vapors of monomer and water and separating the monomer from the water, and vacuum distilling said monomer.

9. Process of preparing methyl methacrylate monomer from polymeric methyl methacrylate, which process comprises heating polymeric methyl methacrylate at a temperature above its decomposition point, condensing the vapors of methyl methacrylate monomer resulting from said heating, distilling said condensed monomer with steam, condensing the reaction mixture of vapors of monomer and water and separating the monomer from the water, passing chlorine gas in the form of fine bubbles through said condensed monomer while under agitation until 0.1–0.25 part, by weight, of chlorine per 100 parts of monomer have been absorbed by said monomer, distilling said monomer with steam, condensing the resulting mixture of vapors of monomer and water and separating the monomer from the water, and vacuum distilling said monomer.

10. Process of preparing methyl methacrylate monomer from polymeric methyl methacrylate, which process comprises heating polymeric methyl methacrylate at a temperature above its decomposition point, condensing the vapors of methyl methacrylate monomer resulting from said heating, distilling said condensed monomer with steam, condensing the reaction mixture of vapors of monomer and water and separating the monomer from the water, passing chlorine gas in the form of fine bubbles through said condensed monomer while under agitation until approximately 0.1 to 2.5 parts, by weight, of chlorine per 100 parts of monomer have been absorbed by said monomer and a water-washed sample of the monomer has a sweet, chloroform-like odor, neutralizing said monomer with an alkaline substance, and vacuum distilling said monomer.

BARNARD M. MARKS.